(12) United States Patent
Duffy, III et al.

(10) Patent No.: US 7,701,327 B2
(45) Date of Patent: Apr. 20, 2010

(54) WIRELESS DISPLAY PANEL HAVING LIGHT STATUS INDICATORS

(75) Inventors: William R. Duffy, III, Raleigh, NC (US); Jeffrey J. Smith, Raleigh, NC (US); David T. Windell, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 12/013,190

(22) Filed: Jan. 11, 2008

(65) Prior Publication Data

US 2009/0179577 A1    Jul. 16, 2009

(51) Int. Cl.
G08B 5/24 (2006.01)

(52) U.S. Cl. .................. 340/488; 340/438; 340/483

(58) Field of Classification Search ............... 315/13.1, 315/39, 224, 246, 248, 250, 358, DIG. 7; 362/257, 263, 329, 330, 562; 340/438, 483, 340/488, 691.1, 915
See application file for complete search history.

(56) References Cited

U.S. PATENT DOCUMENTS

| | | | | |
|---|---|---|---|---|
| 7,038,593 B2 * | 5/2006 | Pederson | ............... | 340/815.45 |
| 7,327,240 B2 * | 2/2008 | Kitayama | ............... | 340/438 |
| 2003/0184239 A1 * | 10/2003 | Myojo et al. | ............... | 315/224 |
| 2005/0168987 A1 * | 8/2005 | Tamaoki et al. | ............... | 362/244 |
| 2009/0146576 A1 * | 6/2009 | Russell et al. | ............... | 315/248 |

* cited by examiner

*Primary Examiner*—David Hung Vu
*Assistant Examiner*—Tung X Le
(74) *Attorney, Agent, or Firm*—Cantor Colburn LLP; Randall Bluestone

(57) ABSTRACT

A wireless display panel for an electronic system includes a plurality of light status indicators. Each light status indicator includes a first chamber attached to the wireless display panel and having an excitable gas inside an end of thereof and a second chamber attached to a surface of the electronic system. The first and second chambers being formed of conducting material and corresponding to each other, connecting with each other to form a sealed enclosure when the wireless display panel is connected with the electronic system. Each light status indicator also includes a generator attached to the surface of the electronic system and surrounded by the second chamber, outputting alternating current (AC) power inside the sealed enclosure for wirelessly transmitting AC current to excite the excitable gas, as determined by the electronic system.

5 Claims, 2 Drawing Sheets

WIRELESS DISPLAY PANEL HAVING LIGHT STATUS INDICATORS

BACKGROUND OF THE INVENTION

1. Field of the invention

This invention relates to a wireless display panel having light status indicators, and particularly to a wireless display panel having light status indicators capable of wirelessly supplying power to the light status indicators thereby eliminating the use of cables and light pipes, and reducing manufacturing and replacement costs.

2. Description of Background

Many electronic systems, such as computer systems and audio systems include a removable front bezel or display panel for aesthetic purposes. Typically, these removable bezels are plastic parts having little or no electronic functionality. Thus, light status indicators are provided on the front of the computer systems which are covered by the removable bezels.

There are different types of display panels having light status indicators which are used in electronic systems. In one type of display panel, a silicon board is provided on the display panel having light status indicators such as light emitting diodes (LEDs), where cable is required to be fastened to a main system board or other component of the computer system in order to supply power to the silicon board on the display panel. Therefore, the cable is required to be detached from the main system board or display panel before the display panel may be removed from the computer system. One disadvantage associated with this type of display panel is that the cable may be damaged while being removed or installed.

In another type of display panel, LEDs are installed on a main system board and plastic light pipes are provided to transfer light through holes in the display panel from the main system board. There are several disadvantages associated with this type of display panel in that a significant amount of light may be lost if the light pipe is required to transmit light for a long distance, such as 4 inches. Further, it is necessary for the light to be transmitted in a substantially straight line. Thus, if there is not a direct path between the LED and the designated display space on the display panel, then the light pipe cannot be used.

SUMMARY OF THE INVENTION

The shortcomings of the prior art are overcome and additional advantages are provided through the provision of a wireless display panel for an electronic system having a plurality of light status indicators. Each light status indicator includes a first chamber attached to the wireless display panel and having an excitable gas inside an end of thereof and a second chamber attached to a surface of the electronic system. The first and second chambers being formed of conducting material and corresponding to each other, connecting with each other to form a sealed enclosure when the wireless display panel is connected with the electronic system. Each light status indicator also includes a generator attached to the surface of the electronic system and surrounded by the second chamber, the generator configured to output alternating current (AC) power inside the sealed enclosure for wirelessly transmitting AC current to excite the excitable gas, as determined by the electronic system.

Additional features and advantages are realized through the techniques of the present invention. Other embodiments and aspects of the invention are described in detail herein and are considered a part of the claimed invention. For a better understanding of the invention with advantages and features, refer to the description and to the drawings.

Technical Effects

Embodiments of the present invention create a wireless display panel having light indicators which eliminates the use of cables and the loss of significant light through light pipes.

As a result of the summarized invention, technically we have achieved a solution which enables the light status indicators to be operable without requiring the use of cables connected between a display panel and an electronic system for transmitting electrical charges to supply power to LEDs, and which enables the light status indicators to be bendable while remaining effective.

DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
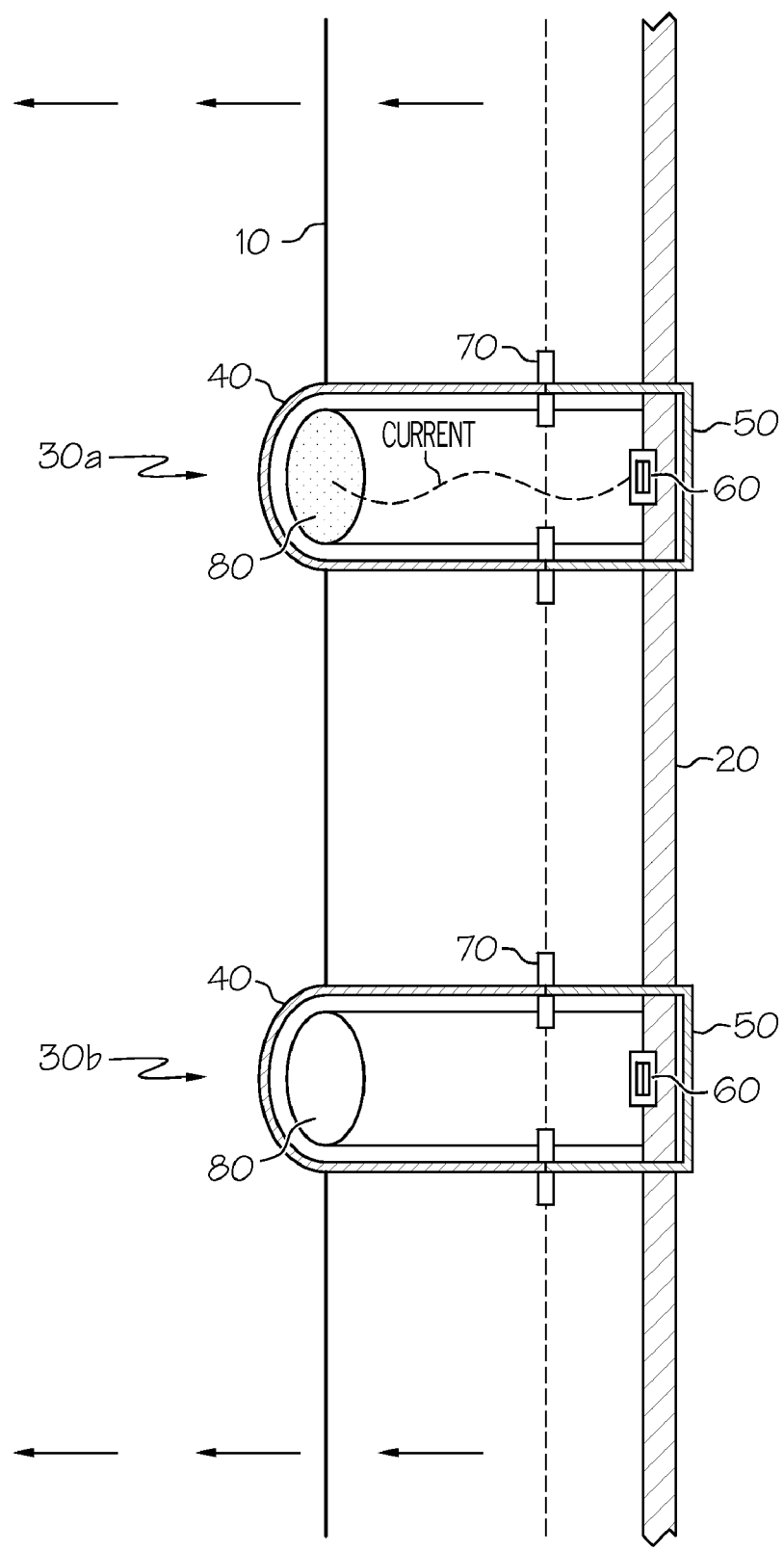
FIG. 1 is a schematic diagram illustrating an example of a wireless display panel having light status indicators that can be implemented within embodiments of the present invention.

Turning now to the drawings in greater detail, it will be seen that in FIG. 1 there is a wireless display panel 10 for an electronic system (not shown), for example, a computer system, to cover an end of a surface 20 of the electronic system. The present invention is not limited to being used in computer systems and may be used in other surface mounted light display panels such as vehicle dashboards and taillights or headlights, audio systems and bendable light snakes, for example. According to an exemplary embodiment of the present invention, the surface 20 of the electronic system may be a printed circuit board or a surface of another component of the electronic system.

According to an exemplary embodiment, the wireless display panel 10 is a removable bezel and comprises a plurality of light status indicators 30a and 30b, for example. The present invention is not limited to any particular number of light status indicators and may vary as necessary. Each light status indicator 30a and 30b comprises a first chamber 40, a second chamber 50 and a generator 60 which outputs alternating current (AC) power.

Figure 2:
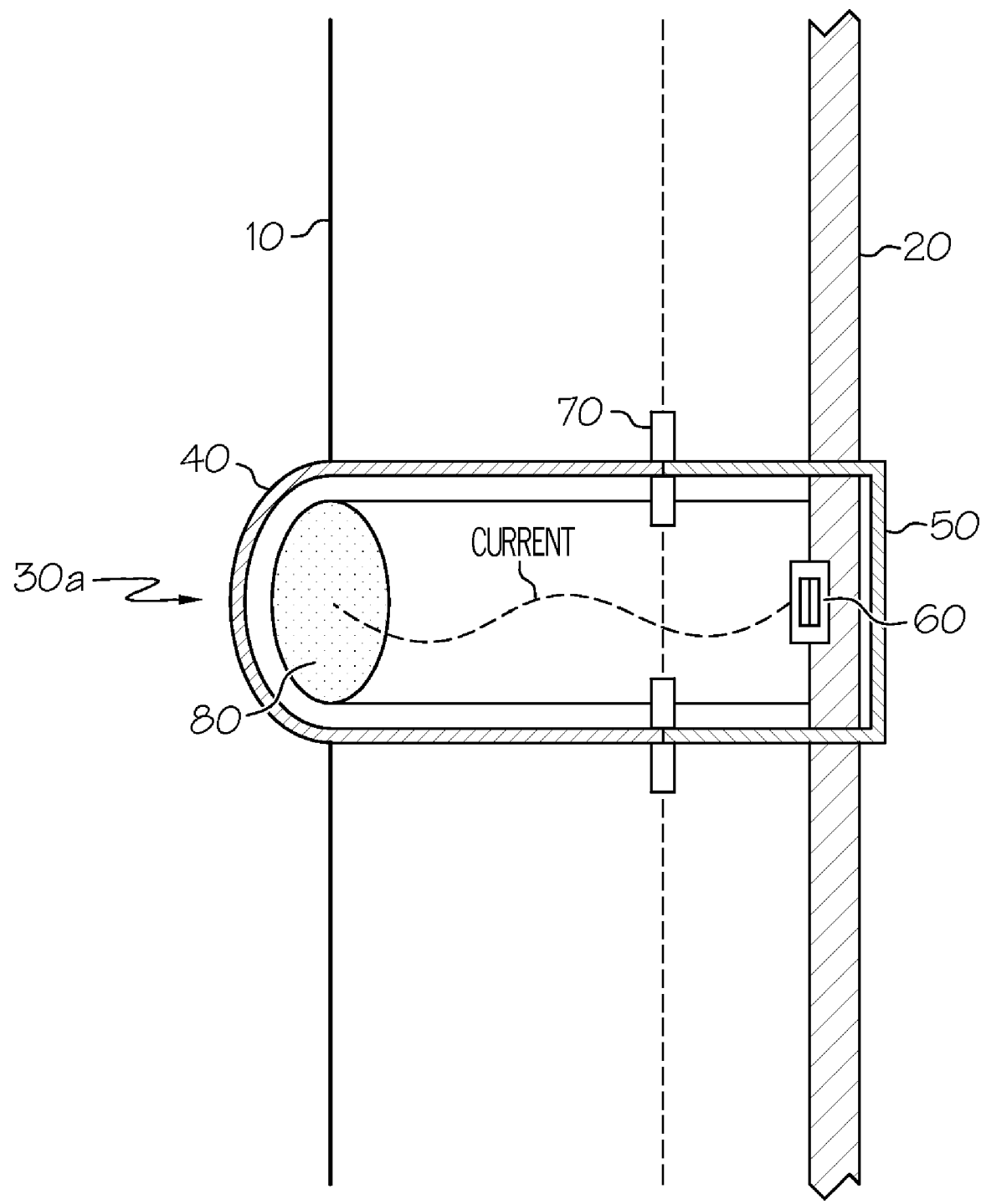
FIG. 2 is a schematic diagram illustrating a light status indicator that can be implemented within embodiments of the present invention.

According to an exemplary embodiment, the first and second chambers 40 and 50 are formed of conducting material such that electric fields cannot transfer through a surface thereof. According to the current exemplary embodiment, the first and second chambers 40 and 50 each comprise a faraday cage or tube. The first and second chamber may be of a cylindrical shape or may vary as necessary. As shown in FIGS. 1 and 2, the first and second chambers 40 and 50 correspond to each other and are connected to each other to form a sealed enclosure when the wireless display panel 10 is connected with the surface 20 of the electronic system. That is, when the wireless display panel 10 is docked onto the surface 20, a sealed dock 70 is created at the point where the first chamber 40 meets the second chamber 50 such that no electricity can penetrate through the sealed dock 70. Further, a dashed line together with arrows shown in FIG. 1, represent where the wireless display panel 10 may be removed from the electronic system.

According to an exemplary embodiment, as shown in FIG. 1, the first chamber 40 is attached to the wireless display panel 10 and comprises an excitable gas 80 (i.e., gas bubble) inside an end thereof. The second chamber 50 is attached to an interior portion of the surface 20 of the electronic system.

The generator 60 is connected with an exterior portion of the surface 20 facing the display panel 10, and is surrounded by the second chamber 50. The generator 60 outputs AC power for wirelessly transmitting AC current inside the sealed enclosure to excite the excitable gas 80, as determined by the electronic system. Since the first and second chambers 40 and 50 are combined to form a sealed enclosure when the wireless display panel 10 is connected with the electronic system, this allows for the safe passage of the AC current from the generator 60. The AC current is transmitted through the air inside the sealed enclosure via near field electrical charges and excites the excitable gas 80 in the first chamber 40, to thereby luminate the excitable gas 80. According to an exemplary embodiment, the excitable gas 80 may be a neon gas, for example.

According to all exemplary embodiment, if the wireless display panel 10 is removed from the electronic system while in an on-state, AC current traveling through the sealed enclosure is cut off from traveling towards the excitable gas 80 such that the AC current does not reach the excitable gas 80 and thus, the excitable gas 80 is not excited.

According to an exemplary embodiment, AC power is selectively outputted from the generator 60 as determined by the electronic system. That is, the electronic system determines when it is necessary to indicate status information via the light status indicators 30a and 30b, and therefore, determines when it is necessary to output AC power from the generator 60 while the electronic system is in an on-state, off-state or sleep state, for example.

Further, according to an exemplary embodiment, when the wireless display panel 10 is removed from the surface 20, the generator 60 automatically stops outputting AC power. When the wireless display panel 10 is removed from the surface 20, the sealed dock 70 becomes unsealed, and a signal may be generated in the electronic system to indicate that the wireless display panel 10 has been removed from the electronic system. A switch (not shown) or a presence detect function in the electronic system may be utilized.

According to an exemplary embodiment, at least one of the light status indicators 30a and 30b may be a fault detection indicator. Therefore, AC power is only outputted from the generator 60 inside the sealed enclosure of the light status indicator 30b when a system fault of the electronic system is detected. For example, as shown in FIG. 1, the light status indicator 30b only receives AC power outputted by the generator 60 if a system fault is detected. When a system fault is detected, the generator 60 outputs AC power to excite the excitable gas 80 in the first chamber 40 of the light status indicator 30b.

The capabilities of the present invention can be implemented in software, firmware, hardware or some combination thereof. Via software implementation, the electronic system determines when to turn on and off the generator 60 based on when the excitable gas 80 needs to be excited. Further, user-defined control of operation of the generator 60 may be implemented.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A wireless display panel for an electronic system, comprising:
    a plurality of light status indicators each comprising:
        a first chamber attached to the wireless display panel and comprising an excitable gas inside an end of thereof;
        a second chamber attached to a surface of the electronic system, the first and second chambers being formed of conducting material and corresponding to each other, connecting with each other to form a sealed enclosure when the wireless display panel is connected with the electronic system; and
        a generator attached to the surface of the electronic system and surrounded by the second chamber, the generator configured to output alternating current (AC) power inside the sealed enclosure for wirelessly transmitting AC current to excite the excitable gas, as determined by the electronic system.

2. The wireless display panel of claim 1, wherein the first and second chambers each comprise a faraday cage or tube.

3. The wireless display panel of claim 1, wherein:
    AC current stops traveling towards the excitable gas upon removal of the wireless display panel from the electronic system while in an on-state, and
    AC power is selectively outputted from the generator as determined by the electronic system.

4. The wireless display panel of claim 1, wherein the generator automatically stops outputting AC power when the wireless display panel is removed from the electronic system.

5. The wireless display panel of claim 1, wherein at least one of the light status indicators is a fault detection indicator in which AC power is only outputted from the respective generator when a system fault of the electronic system is detected.

* * * * *